(12) United States Patent
Am Weg et al.

(10) Patent No.: US 9,772,182 B2
(45) Date of Patent: *Sep. 26, 2017

(54) METHOD AND DEVICE FOR HIGHLY-PRECISE MEASUREMENT OF SURFACES

(71) Applicant: LUPHOS GMBH, Mainz (DE)

(72) Inventors: Christian Am Weg, Langen (DE); Thilo May, Darmstadt (DE); Ralf Nicolaus, Darmstadt (DE); Jurgen Petter, Griesheim (DE); Gernot Berger, Dortmund (DE)

(73) Assignee: LUPHOS GMBH, Mainz (DE)

( * ) Notice: Subject to any disclaimer, the term of this patent is extended or adjusted under 35 U.S.C. 154(b) by 296 days.

This patent is subject to a terminal disclaimer.

(21) Appl. No.: 14/422,338

(22) PCT Filed: Aug. 20, 2013

(86) PCT No.: PCT/EP2013/002500
§ 371 (c)(1),
(2) Date: Feb. 18, 2015

(87) PCT Pub. No.: WO2014/029495
PCT Pub. Date: Feb. 27, 2014

(65) Prior Publication Data
US 2015/0226548 A1  Aug. 13, 2015

(30) Foreign Application Priority Data

Aug. 20, 2012 (DE) ........................ 10 2012 017 015

(51) Int. Cl.
*G01C 3/08* (2006.01)
*G01B 11/30* (2006.01)
(Continued)

(52) U.S. Cl.
CPC ........ *G01B 11/303* (2013.01); *G01B 11/2441* (2013.01); *G01B 21/042* (2013.01); *G01B 21/045* (2013.01); *G01S 17/08* (2013.01)

(58) Field of Classification Search
CPC .. G01B 21/042; G01B 21/045; G01B 11/303; G01B 11/2441; G01S 17/08
(Continued)

(56) References Cited

U.S. PATENT DOCUMENTS 4,989,984 A * 2/1991 Salinger ............... G01B 11/303
250/559.23
5,231,470 A * 7/1993 Koch ................. G05B 19/4207
356/3.11
(Continued)

FOREIGN PATENT DOCUMENTS

DE 60 2004 004916 T2 11/2007
DE 10 2011 011065 A1 8/2012

OTHER PUBLICATIONS

International Bureau of WIPO, Preliminary Report on Patentability and Written Opinion of the ISA (English Language Translation), Mar. 5, 2015, pp. 11-18.

*Primary Examiner* — Mark Hellner
(74) *Attorney, Agent, or Firm* — Christopher C. Dremann, P.C.; Christopher C. Dremann

(57) ABSTRACT

A device for measuring at least one surface portion of an object has a holder on which a reference body and a distance measuring device are arranged. The distance measuring device is pivotally mounted on the holder relative to a first axis and relative to a second axis. The distance measuring device is operable to determine a distance from a first point located on the surface portion of the object and a second distance from a second point located on the reference body.

18 Claims, 10 Drawing Sheets

(51) Int. Cl.
*G01B 21/04* (2006.01)
*G01B 11/24* (2006.01)
*G01S 17/08* (2006.01)

(58) Field of Classification Search
USPC .......................................................... 356/4.01
See application file for complete search history.

(56) References Cited

U.S. PATENT DOCUMENTS 5,377,011 A * 12/1994 Koch ................. G05B 19/4207
  356/602
5,604,593 A    2/1997 McMurtry
8,736,850 B2 *  5/2014 Am Weg ................ G01B 21/04
  356/601

* cited by examiner

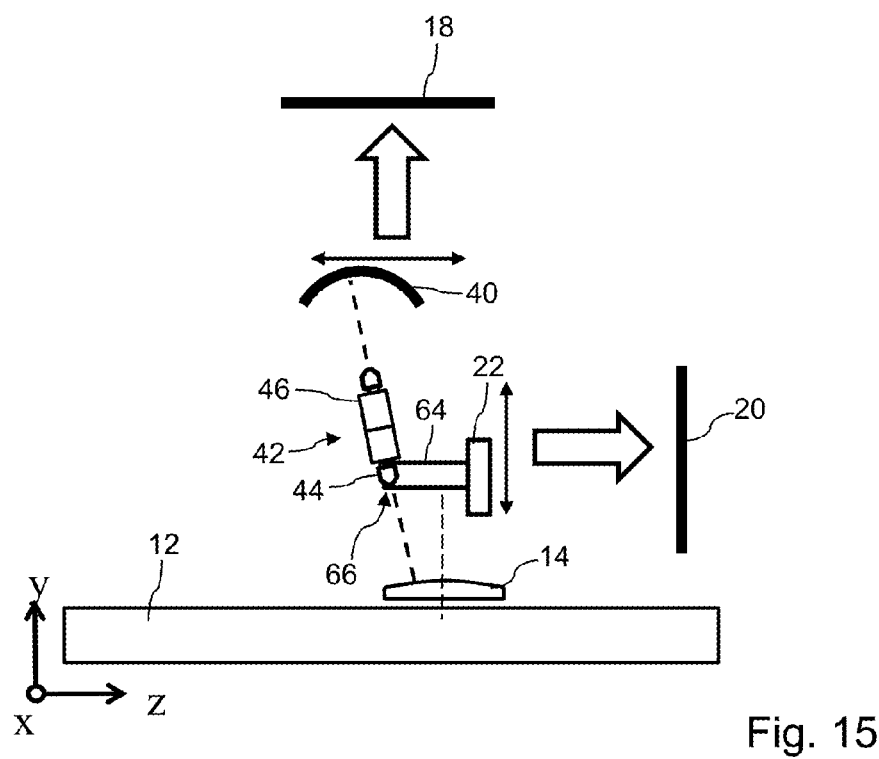
Fig. 15
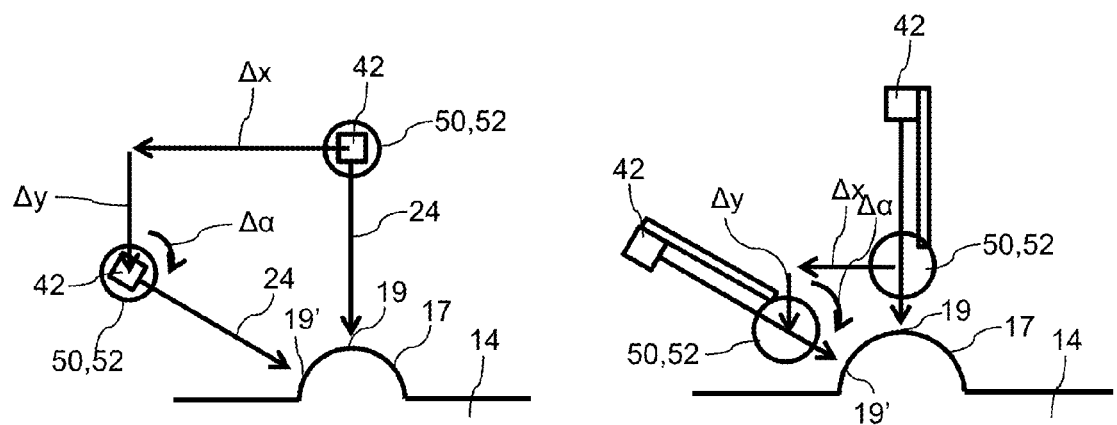
Fig. 16a
Fig. 16b

METHOD AND DEVICE FOR HIGHLY-PRECISE MEASUREMENT OF SURFACES

CROSS REFERENCE TO RELATED APPLICATIONS

This United States non-provisional patent application is the national stage of International Application No. PCT/EP2013/002500 filed Aug. 20, 2013, which claims the benefit of priority to German Application No. 10 2012 017 015.7 filed Aug. 20, 2012.

FIELD OF THE INVENTION

The present invention relates to a method and a device for the highly precise measurement of the topology or the surface of any object on the basis of preferably optical, contactless sensing of the object.

BACKGROUND AND RELATED ART

For the purposes of quality assurance, and also for monitoring industrial production processes, particularly in the field of precision engineering, optics, and in production engineering of optical, mechanical and electric microstructures, there is an increasing need for a precise measurement of work piece surfaces with the highest possible resolution.

Thus, for example, DE 10 2008 033 942 B3 has disclosed a distance sensor operating on the principle of multi-wavelength interferometry, which employs a plurality of laser light sources, the emitted wavelengths of which lie in the optical telecommunication range between 1520 nm and 1630 nm. The signals of the lasers used herein are combined in a common fiber by means of a multiplexer and transmitted to a multi-wavelength sensor head. In principle, such a multi-wavelength distance measuring method enables interferometric sensing of topologies and surfaces of any object using reflection geometry, wherein the multi-wavelength method provides a comparatively large, uniquely assignable measuring region and moreover renders it possible to achieve a measurement accuracy in the nanometer range and even in the sub-nanometer range.

Furthermore, DE 60 2004 004 916 T2 has disclosed an optical surface measuring device, in which a contour sensing distance sensor is placed substantially orthogonal to the surface to be measured. Here, the distance sensor is placed onto a rotatable device, which itself is arranged on a platform that is movable in relation to a measurement frame. Furthermore, a measurement surface is provided on the device receiving the distance sensor, the distance of which measurement surface to the measurement frame is measured by means of an apparatus for the contactless distance measurement.

In the case of such a sensor sensing the surface of an object in a contactless manner, for example within the scope of a scanning movement, the movement and the positioning accuracy of the sensor in relation to the object to be measured play a decisive role.

In order to be able to precisely establish the distance between the distance sensor and the surface to be measured, the sensor must be aligned substantially orthogonal to the surface to be measured and it must adapt the alignment thereof in accordance with the contour of the object to be measured. For this adaptation, both translational movements and rotational movements of the sensor are to be carried out.

In the case of a required measurement accuracy in the nanometer range or sub-nanometer range, a rotation of the sensor furthermore also always brings about a non-negligible translational displacement of the sensor in relation to the holder or platform supporting the sensor. Thus, the measurement signal from the sensor must be corrected for at least the positional displacement of the sensor caused by the rotational movement of the sensor. The mechanical tolerances of the sensor bearing cause non-reproducible positional changes of the sensor at different angular positions. It is therefore necessary to precisely determine the position of the sensor for every possible alignment of the sensor.

Currently known methods and devices for the highly precise measurement of surfaces have until now only been suitable for measuring surfaces having a predetermined symmetry. Sensing the entire surface of the object in this respect requires a rotation of the object, for example about the axis of symmetry thereof. By way of example, this allows the whole topology of the surface to be measured and logged by means of a measurement head or distance sensor mounted in a manner merely swivelable in a single plane. Such measurement concepts are not suitable for objects with a so-called free-form surface, which does not follow any predetermined symmetry.

OBJECTS AND ADVANTAGES OF THE INVENTION

It is therefore an object of the present invention to provide a device for measuring a free-form surface of an object, in particular for the highly precise measurement thereof, wherein possible positional inaccuracies of the sensor, for example caused by a translational and/or rotational movement of a sensor head, can be determined and correspondingly compensated for in a simple manner. Here, the measuring device should be distinguished by a setup which is as simple and compact as possible and which can also be implemented in a comparatively cost-effective manner. It should furthermore be embodied to be as resilient as possible in relation to external interference.

SUMMARY OF THE INVENTION

This object is achieved by a method and a device in accordance with the exemplary embodiments of the invention shown and described herein.

The device according to the invention, provided in this respect, is configured for measuring at least one surface portion of an object preferably mounted or arranged on a support. Here, the object or the surface portion thereof may include a so-called free-form surface with a comparatively irregular and correspondingly nonsymmetrical or asymmetrical external contour. Here, the object to be measured can, for example, be embodied as a so-called off-axis paraboloid or include a lens array. However, it is also possible to measure surface forms which, in two mutually orthogonal directions or sectional planes, can be described by means of polynomial terms and, in terms of the form thereof, resemble a saddle surface.

The device according to the invention includes at least one holder. Furthermore, a reference body and a distance measuring apparatus are arranged on the holder, wherein the distance measuring apparatus is mounted on the holder in a manner swivelable in relation to a first axis and also in relation to a second axis. Here, the first and second axes extend in different directions or in different planes. However, they can also lie in a common plane and, in this respect, form an axial plane.

By means of the swivelable mounting of the distance measuring apparatus in respect of at least two axes, said distance measuring apparatus can be aligned with almost any alignment in relation to the holder or in relation to the support and the object arranged thereon. In particular, this enables the measurement of a free-form surface of the object by virtue of the distance measuring apparatus, which is designed in either a tactile or contactless manner or preferably in an optically reflecting manner, respectively being able to be aligned approximately orthogonal to a first point situated on the surface portion to be measured.

In order to be able to provide an orthogonal alignment of the distance measuring apparatus in relation to the respective point of the surface portion to be measured, in particular for the optical and contactless sensing of the surface portion, the distance measuring apparatus is firstly arranged on the holder in a manner swivelable in a virtually arbitrary manner, while the holder itself is positionable in an arbitrary manner relative to the object or relative to the support. In this manner, it is possible to sense all points of the surface portion to be sensed from different directions. Here, it is irrelevant whether the holder or the object is mounted in a movable manner. What is decisive is, in particular, a relative movability between holder and object.

Here, the respective sensing direction is predetermined by the contour of that surface portion which includes the point currently to be measured. Particularly in the case of the optical and contactless and also reflecting measurement of the surface portion, it is necessary for a measurement beam to be reflected by the corresponding surface portion to be incident on the surface portion in an approximately perpendicular manner. Since the surface portion of the object to be measured in the case of a free-form surface to be measured may have an almost arbitrary contour, it is necessary to sense all points of the free-form surface portion to be sensed from all feasible measurement directions corresponding to the respective curvature of the surface portion to be sensed.

By virtue of the first and the second axis not being aligned parallel to one another, but rather being approximately perpendicular or at a predetermined angle in relation to one another, it is possible to provide arbitrary sensing directions for the distance measuring apparatus.

Furthermore, the distance measuring apparatus is configured to determine a first distance to a first point of the surface portion of the object to be measured and also a second distance to a second point, corresponding thereto, of the reference body. The first distance to be established by means of the distance measuring apparatus constitutes the actual measurement signal, while the measured second distance renders it possible to establish a possible relative displacement, caused by rotation, between the distance measuring apparatus and the reference body likewise arranged on the movable holder. In this respect, there can be a distance correction for the measured first distance on the basis of the second distance to be measured.

A non-reproducible displacement, for example caused by the rotational movement of the distance measuring apparatus, of a distance sensor provided there and a falsification of the measurement values resulting therefrom can be compensated for by determining the second distance in relation to a reference body which is known in respect of the contour and position thereof. An offset between an axis of rotation and a measurement axis of the distance measuring apparatus can be established and compensated for computationally by establishing the first and second distances.

In an advantageous embodiment, the device includes a support which serves for the defined receiving and mounting of the object. In so doing, the support can provide a reference frame or a reference structure, in respect of which individual measured distances can be compared to one another.

Here, provision is made, in particular, for relative movability between support and holder, or between object and holder. Advantageously, the holder is embodied in a movable manner in relation to the preferably stationary support. However, it is also conceivable for the object to be arrangeable not directly on the support, but only via a displacement unit. In this respect, a relative movement between object and holder can also be implemented in the case where the holder is fixed in space and the object is mounted on the support in a movable manner.

According to a further advantageous embodiment, the device includes at least one reference object, preferably a plurality of reference objects, by means of which the position of the movable holder is determinable. To this end, provision is made, in particular, for a relative position of the holder in relation to at least one reference object to be establishable by means of a number of further distance measuring position sensors in order, ultimately, to be able to determine the position of the distance measuring apparatus in relation to the reference object. Here, the position of the at least one reference object in relation to the support is to be assumed to be known such that the position of the holder or of the distance measuring apparatus in relation to the support and the object arrangeable thereon is also determinable by determining the distance between the reference object and the holder.

According to a preferred development, the distance measuring apparatus arranged on the movable holder includes a first distance sensor facing the object to be measured and a second distance sensor facing the reference body. The first distance sensor serves for measuring the distance between the distance measuring apparatus and the object to be measured, while the second distance sensor serves to determine the distance of the distance measuring apparatus or the first distance sensor relative to the reference body. The position of the holder, in turn, can be determined in relation to the at least one, preferably in relation to two, more preferably in relation to at least three stationary reference objects by means of at least one, preferably by means of two or more preferably by means of three sensors aligned in different directions.

According to a further preferred embodiment, the first and the second distance sensors are fixed in terms of location in relation to one another. However, the first and second distance sensors can assume a fixed but defined position and alignment relative to one another, such that, for every conceivable alignment of the first distance sensor, the second distance sensor can compensate a positional change caused by the rotation or swiveling of the first distance sensor by way of a defined correction measurement, calibrated in advance, in relation to the reference body.

Advantageously, the first and the second distance sensors are aligned substantially diametrically in mutually opposite directions. While the first distance sensor points toward the object and is able to determine a first distance to the first point situated on the object, the second distance sensor, aligned against the actual measurement direction, serves for a correction measurement in relation to the reference body.

Here, the reference body is, in particular, arranged on the holder in a rotationally secured manner such that with every conceivable alignment of the first distance sensor, which can be uniquely set by appropriate first and second angles in relation to the first and second axes of rotation, the second distance sensor of the distance measuring apparatus can determine a corresponding correction signal, which may serve for compensating positional inaccuracies, caused by swiveling or rotation, of the distance measuring apparatus or the first distance sensor thereof.

According to a further advantageous embodiment, the distance sensors of the distance measuring apparatus are almost arbitrarily orientable in space or arbitrarily alignable, at least within a predetermined, imagined conical volume. What this can achieve is that at least the first distance sensor, for each first point lying on the surface portion, aligned in relation to the object to be measured can be aligned approximately orthogonal or parallel to the surface normal of the first point.

According to a further preferred embodiment, an imagined connecting line between the first point and the second point furthermore intersects a crossing point of the first and the second axis. In other words, the first and second distance sensors, which are preferably aligned diametrically in mutually opposite directions, of the distance measuring apparatus lie on the imagined connecting line which extends from the first point situated on the object surface to the second point situated on the reference surface of the reference body. By virtue of a crossing point of the first and second axis lying on said imagined connecting line, swiveling or rotating of the distance measuring apparatus in relation to the first and the second axis is typically accompanied by pure tilting of first and second distance sensors in relation to the reference surface and/or the object to be measured.

According to a further advantageous embodiment, the reference body furthermore includes a reference surface tuned to the swivelable movability of the distance measuring apparatus on the holder. Here, the reference surface is advantageously embodied in such a way that a measurement signal emitted by the second distance sensor can be reflected by the reference surface and re-detected by the second distance sensor. Here, provision is made, in particular, for the reference surface to be configured for the movable or pivotable mounting of the second distance sensor facing it such that, in each conceivable orientation or alignment of the second distance sensor, an orthogonality condition on the reference surface, which, for example, is required for optical sensing, is ensured.

According to a further preferred embodiment, provision is furthermore made here for the reference surface to be embodied as a substantially spherical hollow mirror with a substantially spherical segment-like geometry. Here, an imagined sphere center advantageously substantially coincides with the first and/or with the second axis. Here, it is furthermore conceivable for the center of the spherical segment to substantially coincide with a point of intersection of the first and second axes.

By way of example, a spherical, elliptical or otherwise three-dimensional embodiment of the reference surface or of the reference body including the reference surface, which embodiment is adapted to the movability or the optical coupling characteristics of the distance measuring device, is required so as to be able to provide a correction signal for the positional deviation, caused by swiveling or rotating, of the distance measuring device in every conceivable alignment of the distance measuring apparatus.

Here, according to an advantageous embodiment, provision can be made, in particular, for the distance measuring device to be arranged on the holder by means of at least three, preferably by means of at least six location or length changeable suspensions. By way of example, the individual suspensions can be arranged distributed around the outer circumference of the distance measuring device such that a targeted alignment and reorientation, or a swiveling of an individual suspension or a plurality of suspensions, can overall initiate a swiveling or rotational movement of the distance measuring apparatus. In the case of such an embodiment, approximately corresponding to a so-called hexapod, it is possible to realize almost any virtual rotational axis depending on the configuration of the location or length changeable suspensions.

In particular, a rotational movement in relation to a stationary axis can be implemented by shortening one suspension while at the same time lengthening another suspension. Within the meaning of the present invention, the aforementioned first and second axes can also be embodied in a positionally changeable manner on the holder. If it is not only the alignment, but also the distance, of the second distance sensor that changes in relation to the reference surface as a result of a length change of a suspension, this plays almost no role for the evaluation of the measurement signal of the first distance sensor since, by way of example, a formation of a sum or difference of the signals that can be generated by the first and second distance sensor is used for the absolute distance measurement for the purposes of determining the distance to the first point on the object surface.

Of course, a positional change in relation to the holder caused by, for example, the rotational or swiveling movement of the distance measuring apparatus can be compensated for precisely by means of the distance measurement in relation to the reference surfaces formed on the reference body.

Furthermore, provision is made according to a further embodiment for the distance measuring apparatus to be arranged on the holder by means of a bearing arranged on a cantilever in a manner rotatable about the second axis. The bearing forming or holding the second axis in this case is preferably situated at the imagined center point of the spherical segment-like geometry of the reference surface of the reference body, which is embodied, by way of example, as a spherical hollow sphere. By contrast, the cantilever on which the bearing, and hence also the distance measuring apparatus, is arranged in a rotatable manner has a predetermined length or geometry which enables a largely free rotatability of the distance measuring apparatus in relation to the cantilever. In the case of such an embodiment, which approximately corresponds to a so-called gimbal, it is possible, depending on the configuration of the suspensions, to realize virtually arbitrary alignments of the distance measuring apparatus.

According to a further preferred embodiment, the cantilever itself is mounted on the holder in a manner rotatable about the first axis. Here, the first and second axes of rotation can, in particular, be aligned orthogonal or perpendicular to one another. Furthermore, it is conceivable and advantageously provided for the first and the second axis to intersect at a mutual connection point of cantilever and bearing.

According to a further advantageous embodiment, provision is furthermore made for a control unit, which is configured to align the first distance sensor substantially along the surface normal of the first point of the surface portion of the object. Here, the control unit preferably serves for substantially automatic or independent adjustment and rotational movement of the first distance sensor in such a way that the optical signals emitted thereby are reflected back by the object or by the surface portion thereof.

In the case of a reflecting surface of the object, there is a return reflection in the region of around 180° in relation to the emitted signal. Depending on the sensor embodiment, a geometry deviating from the surface normal of the surface portion to be examined by up to 3°, 5° or 10° may, however, also still be sufficient for determining the distance. In the case of rough or scattering surfaces, different alignments of the sensor in relation to the surface normal of the surface portion to be measured, deviating from these, may also be required.

In a preferred embodiment, provision is made, in particular, for the movable holder, comprising the reference body thereof and the distance sensors arranged thereon in a swivelable or rotatable manner, to be moved or movable in a scanning movement in relation to the object. Here, the object can be scanned in accordance with a scan by a first measurement beam, emitted by the first distance sensor, along the object portion to be measured. Within the scope of a scanning successive sensing movement, the holder, which is movable relative to the support or relative to the object, is moved together with the reference body thereof. Naturally, provision can alternatively also be made for the holder to be embodied in a stationary manner while the support is moved relative to the holder together with the object arranged thereon for the purposes of measuring said object. A relative movement between holder and object or between distance measuring apparatus and object can follow predetermined movement patterns. By way of example, the surface of the object can thus be scanned in an approximately line shaped manner, in a meandering manner or else in a spiral manner.

Independently of how a relative movement between holder and object is realized, a distance between the reference body and the surface of the object to be measured can be determined respectively by means of the distance measuring apparatus comprising the two distance sensors thereof, which are preferably aligned diametrically in mutually opposite directions. Finally, the contour and the surface property of the measured object can be deduced from a comparison of a preferably electronic evaluation of a multiplicity of established distance measurement values.

Furthermore, it was found to be particularly advantageous for the second distance, establishable by the second distance sensor, to the reference body to be directly usable for correcting the distance value which is establishable by the first sensor.

Finally, according to a further preferred embodiment, provision is made for at least one position sensor to be coupled to the holder, by means of which position sensor the spatial position of the holder is determinable in relation to the at least one reference object. Here, in particular, provision is made for at least two, preferably three position sensors to be coupled to the holder, in particular to be arranged on the holder, and for a reference object specifically embodied for this to be provided for each one of the preferably three position sensors. The location and the contour of the reference object provided during the optical position determination of the holder can be determined precisely, for example by virtue of an appropriate calibration.

By determining the position of the holder in relation to the at least one reference object, or in relation to three reference objects distributed in space, the position of the holder can be precisely established relative to the reference objects and consequently relative to the reference system formed thereby. If, furthermore, the at least one reference object has a fixed geometric relationship to the support, for example if the at least one reference object is fixable in terms of location in relation to the support and the object arrangeable thereon, it is possible to determine the relative position of the holder, the reference body thereof and the reference surface formed thereon by e.g. an optical determination of the position of the holder in all three spatial directions relative to the reference object.

Building on such a rough determination, the actual distance between the surface of the object to be measured and the distance measuring apparatus, in particular the reference surface, can be determined very precisely, for example in the nanometer range or even in the sub-nanometer range, with the aid of the distance measuring apparatus. Here, a topography of the surface of the object to be measured can be established from two highly precisely determinable relative distances. Firstly, it is possible to determine the distance between the support and the holder and secondly it is possible to determine a distance between the holder and the object. Finally, the surface of the object can be correlated to the support from these relative distances, provided that the overall system was previously calibrated by means of at least one suitable master object with known dimensions.

In this embodiment, the three position sensors mentioned above can be arranged either on the holder or else away from the holder on the at least one reference object or on a plurality of respectively provided reference objects. In the case of an arrangement of the three position sensors aligned approximately in the three spatial directions (x, y, z) on the holder, provision is made for the at least one reference object to provide three mirror surfaces corresponding to the directions (x, y, z) to be measured.

These mirror surfaces are to be logged precisely in advance in respect of the contours and surface characteristics thereof in order to calibrate the whole measurement device prior to carrying out a surface measurement procedure for an object. Such a calibration is necessary provided that the holder is mounted in a movable manner in all three spatial directions in relation to the at least one reference object, preferably in relation to three separate reference objects, but in particular in relation to the support.

According to a development thereof, three further support sensors can also be provided in addition to the three position sensors, by means of which further support sensors the spatial position of the support is determinable in relation to the at least one reference object and/or in relation to a displacement unit supporting the object. Here, provision is made, in particular, for the support supporting the object or the object itself to possibly be the subject matter of a movement in relation to the holder or in relation to the distance measuring apparatus arranged thereon. If both the holder and the object, or a structure supporting the object, for example in the form of the support itself or in the form of a displacement unit, are mounted in a movable manner, care merely has to be taken that, overall, a relative movement between object and holder is realizable in all three spatial directions.

Thus, for example, provision can be made for the holder to be mounted in a movable manner in merely one spatial direction, for example orthogonal or parallel to the surface normal of the support, while the support is movably mounted approximately parallel to the support plane thereof in relation to reference objects lying away from the support.

Only for monitoring purposes, in particular as to whether the support in fact remains in the support plane in the case of a movement in the latter, should a two-dimensional reference object corresponding to the movement of the support for example be provided on the lower side of the support facing away from the holder. In the case of a movable configuration of the support in the support plane or parallel thereto, a one-dimensional translational mobility, aligned approximately orthogonal or perpendicular to the support plane, can be provided for the holder.

What can be achieved by subdividing the three degrees of freedom of movement into the movement of holder and support is that, in particular, only a single reference object configured in two dimensions is required for determining the relative positions between the object situated on the support and the holder, while remaining reference objects for the remaining support sensors and position sensors can be configured in the form of, by way of example, one-dimensional reference strips or reference rods.

Reducing reference objects configured in a planar and two-dimensional manner can significantly reduce the production work and, in particular, the assembly and installation work for such a device. The measurement and calibration of the position sensors configured for determining the support position is comparatively complex for a positionally accurate calibration of the device. By reducing the degrees of freedom for the movement or positioning of holder and/or support, the overall number of position sensors and support sensors to be implemented increases, but the costs and the production, in particular the assembly outlay and adjustment outlay for individual sensors, in practice prove to be advantageous compared to calibrating or referencing large area reference objects with a planar embodiment.

According to a further preferred embodiment, provision is made for the two axes, in respect of which the distance measuring apparatus is mounted in a rotatable manner, to be situated between a geometric center of the two distance sensors of the distance measuring apparatus and the object to be measured. As a result of this, advantageous effects can emerge, in particular for a scanning sensing of the surface of the object. A displacement of the axes of rotation directed toward the object can shorten the displacement paths of the holder and effectively increase the scanning speed. Here, it proves to be particularly advantageous if the various drives provided for moving holder and distance measuring apparatus are actuated in such a way that as it were virtual axes of rotation emerge during the scanning process, which virtual axes of rotation lie outside of the holder, sometimes even on the surface of the object.

In this respect, it would be conceivable to swivel and/or displace the distance measuring apparatus in the style of a pivot axis such that the distance measuring apparatus is swivelable in relation to the first point on the surface of the object.

Finally, according to a further independent aspect, provision is made for a method for measuring at least one surface portion of an object using the above-described device. Here, the object and a holder, on which a reference body and a distance measuring apparatus mounted in a manner swivelable in relation to a first axis and in relation to a second axis are arranged, are moved relative to one another in at least a first direction (x, y, z) and the distance measuring apparatus is swiveled in relation to the two axes, wherein, furthermore, a first distance to a first point of the surface portion of the object and a second distance to a second point of the reference body corresponding thereto are determined by means of the distance measuring apparatus.

Here, the object is preferably scanned, by way of example, optically by a contactless sensing movement of the holder, or sensed by a measurement beam focused on the surface of the object.

Here, a first distance to a first point situated on the surface portion of the object and a second distance to a second point situated on the reference body is determined by means of a holder, which is movable relative to at least one reference object and on which a reference body and a distance measuring device are arranged. In order to determine the distances, the distance measuring apparatus is swiveled on the holder in relation to a first axis and in relation to a second axis.

The distance between the distance measuring apparatus or between the reference body and the surface portion to be measured can be determined precisely, namely with an accuracy down to the nanometer range, from the two distances, which are established by means of a first or a second distance sensor, if the position of the holder, of the reference body and/or of the distance measuring apparatus relative to the reference object is known and determined in advance or at the same time.

By sensing the surface portion, for example by means of a scanning movement or a movement which senses in various directions on the surface portion, said movement being that of an optical sensing signal or sensing beam emitted by the distance measuring apparatus, it is possible to sense the whole surface portion and correspondingly measure the latter.

Further aspects of the measuring method emerge from the setup and the operation of the device described above for measuring the surface portion. In this respect, all properties, features and modes of operation described in relation to the device apply equally to the aforementioned method, and vice versa.

BRIEF DESCRIPTION OF THE DRAWINGS

Further goals, features and advantageous application options of the invention are explained in more detail in the following illustration of exemplary embodiments. Here, all features depicted in the various figures and also described in the text form the subject matter of the invention, both on their own and in any sensible combination. Furthermore, like reference characters identify and refer to like parts, components, elements and the like, in the various figures.

FIG. 15 shows a modified arrangement of the distance measuring apparatus.

FIG. 16a shows a schematic diagram of the displacement paths of the distance measuring apparatus comprising a conventional sensor arrangement.

FIG. 16b shows a schematic diagram of the displacement paths of the distance measuring apparatus comprising a sensor arrangement displaced in the measurement direction.

DETAILED DESCRIPTION OF EMBODIMENTS OF THE INVENTION

Figure 1:
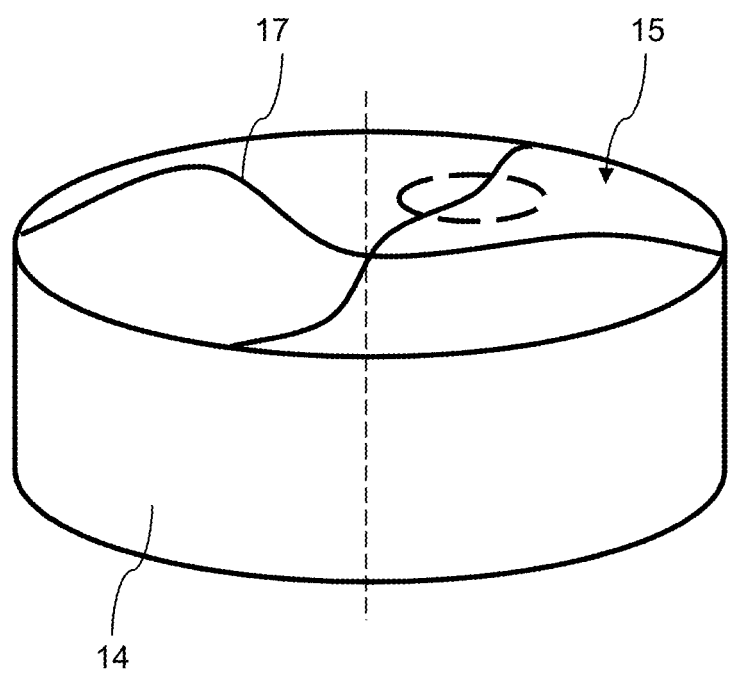
FIG. 1 shows a very simplified schematic illustration of an object to be measured, comprising a surface portion including, by way of example, a free-form surface.

The object 14 depicted schematically in FIG. 1 includes a surface 15 to be measured comprising for example a surface profile 17 with any curvature, which represents a so-called free-form surface. The object 14 is typically embodied as a lens or mirror or a different optical component comparable thereto, which has been provided with a free-form surface. However, it is also feasible to measure periodic structures such as, for example, a lens array. The surface 15 to be measured has, in particular, optically reflecting properties in order to be able to carry out a precise, contactless, light reflection-based measurement and characterization. However, the application is by no means restricted to measuring optically smooth reflecting surfaces, but can also be used universally for measuring comparatively rough surfaces.

Figure 2:
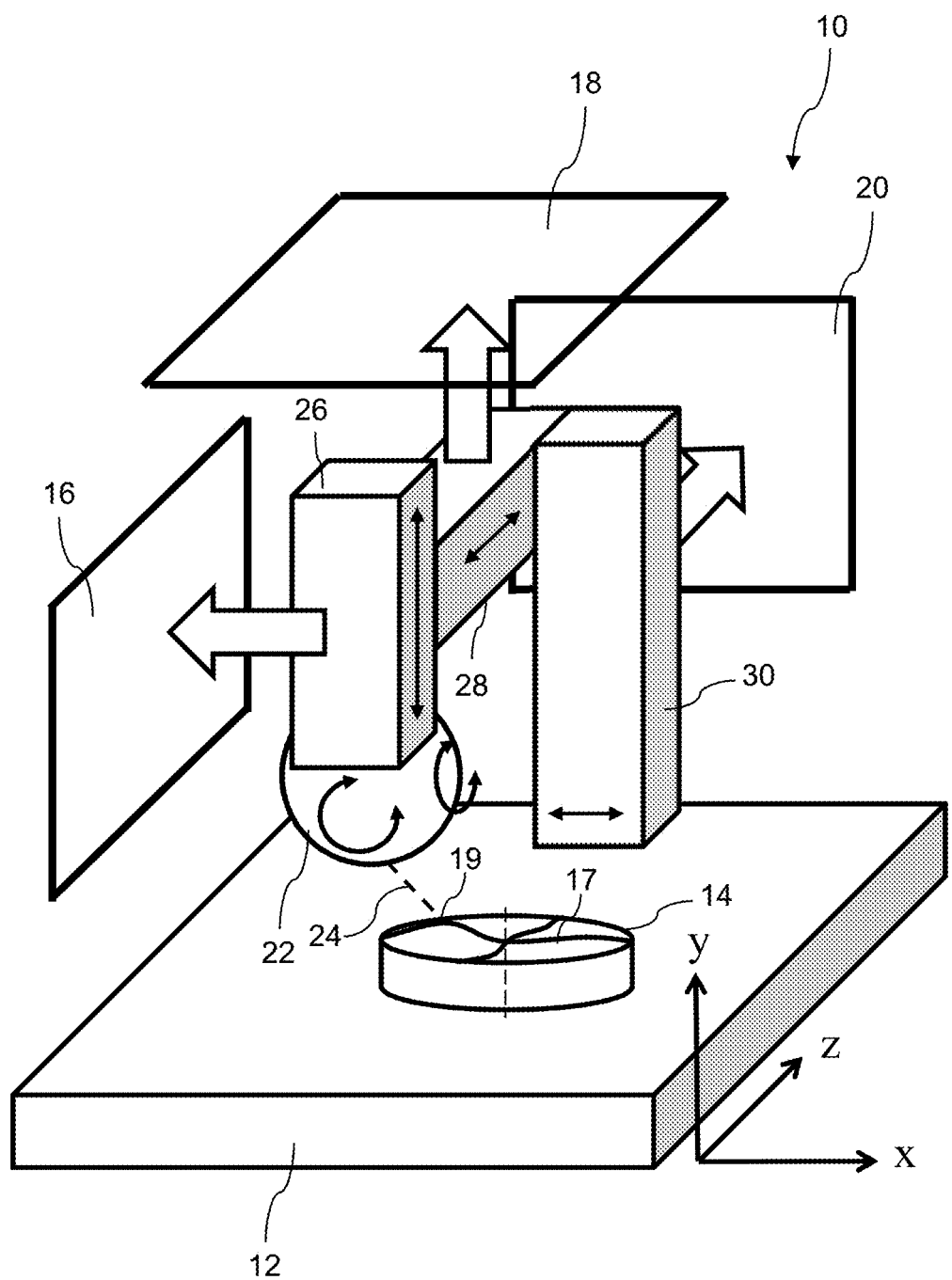
FIG. 2 shows a schematic diagram of the device for measuring the surface portion according to a first embodiment of the present invention.

In this respect, the device depicted schematically in FIG. 2 includes a support 12, on which the object 14 to be measured is positioned. Furthermore, in the illustration in accordance with FIG. 2, provision is made for three separate reference objects 16, 18, 20, for example in the form of planar mirrors. The reference objects 16, 18, 20 are arranged in a stationary, i.e. a non-moving and positionally fixed, manner at defined positions and include a mirrored surface, which is known as a result of, for example, a preceding calibration and stored in the device 10.

Figure 3:
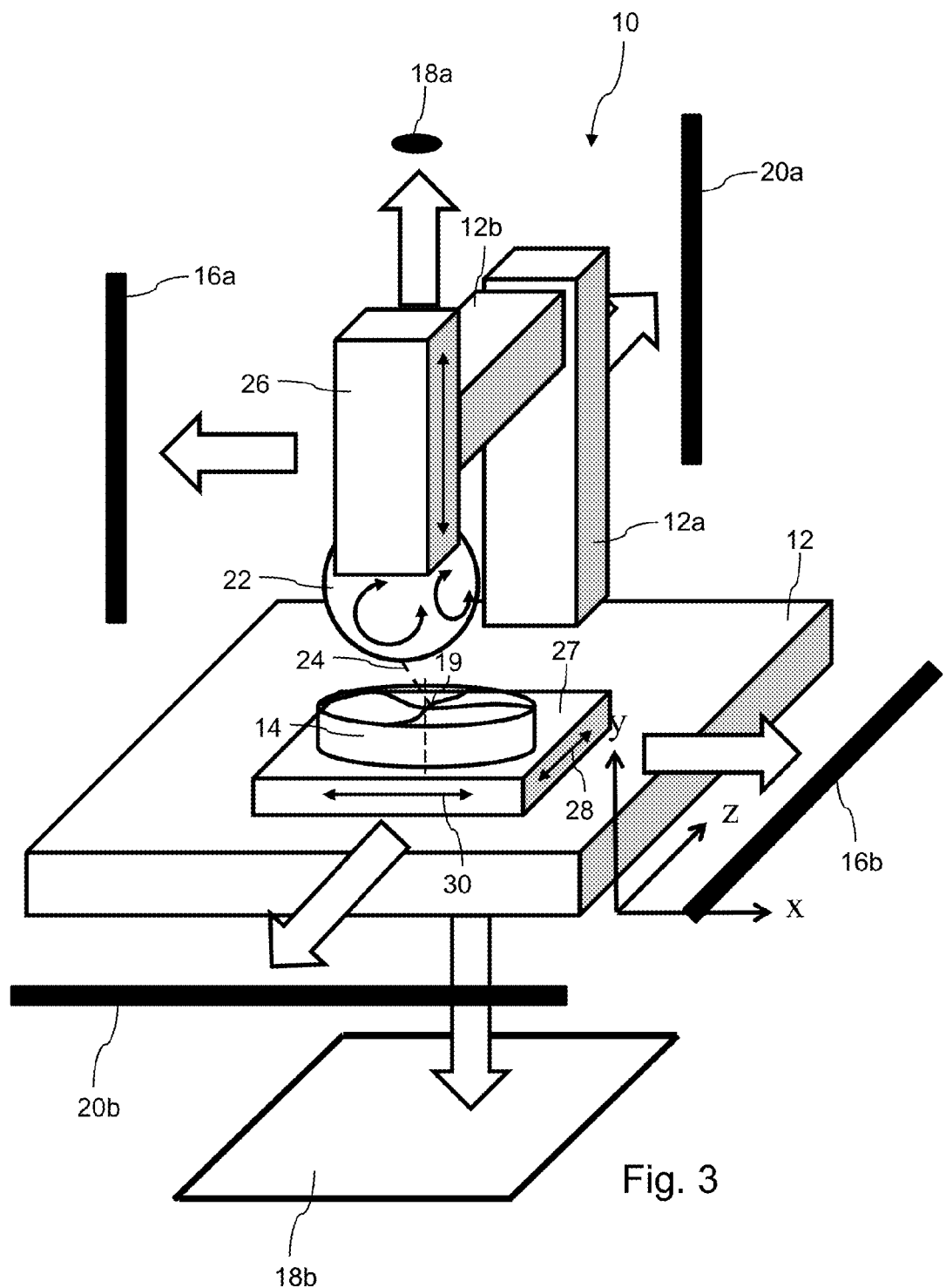
FIG. 3 shows a further embodiment of the device in a schematic diagram.
Figure 4:
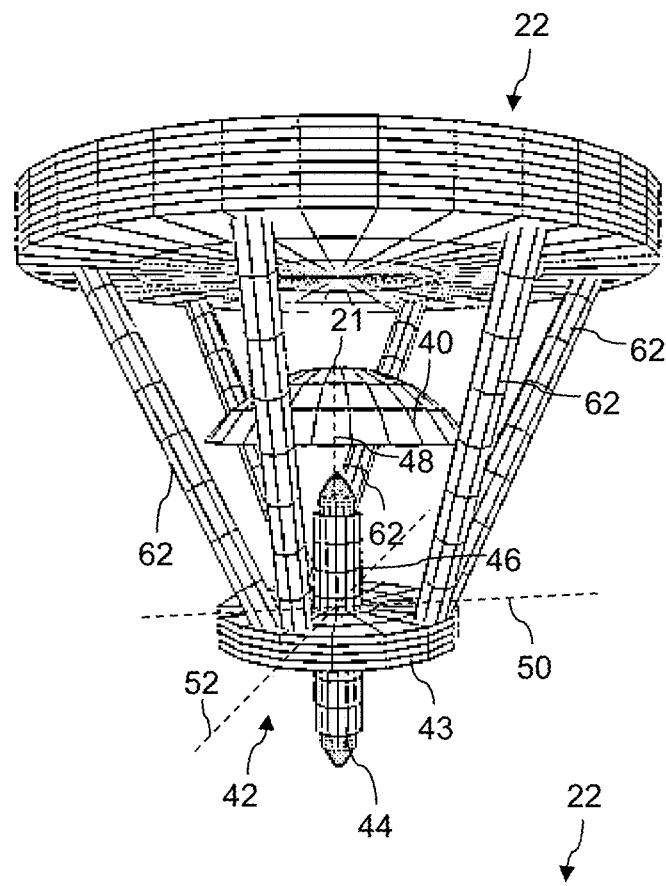
FIG. 4 shows an isolated, schematic illustration of a holder embodied in the style of a hexapod in a first configuration.

For the purposes of measuring the surface 15 of the object 14, provision is furthermore made for a holder 22, which is merely depicted schematically in FIGS. 2 and 3 and on which a reference body 40 and a distance measuring apparatus 42 are arranged. The embodiments in accordance with FIGS. 4 to 12 in this case show two different options for a distance measuring apparatus 42 arranged on the holder 22 in a swivelable manner.

Independently thereof, the one reference body 40 providing an, by way of example, three-dimensional, spherical reference surface 41 is embodied as a spherical hollow mirror. By contrast, the distance measuring apparatus 42 includes two distance sensors which are arranged diametrically opposite to one another and aligned in mutually opposite directions, namely a first distance sensor 44 and a second distance sensor 46.

While the first distance sensor 44 is aligned in relation to the surface 15 of the object to be measured and can, in relation to a first point 19, determine a corresponding first distance 24 to the object 14, the second distance sensor 46 aligned in a mutually opposite direction is aligned in relation to the reference surface 41 of the reference body 40. For the purposes of calibrating the measuring apparatus 10, the contour of the reference surface 41 is to be determined, in particular measured, precisely in advance. The contour thereof and the individual second points 21 to be sensed on the reference surface 41 are known in terms of the position thereof and stored in an evaluation unit or control unit 70.

In this respect, the first sensor 44 is configured to determine a first distance 24, indicated in FIGS. 2 and 3, to a first point 19 situated on the surface 15 of the object 14, while the second distance sensor 46 is configured to determine a second distance 48, in an opposite direction, to a second point 21 situated on the reference surface 41 of the reference body 40.

In the two different embodiments of the holder, depicted in FIGS. 4 to 7 and FIGS. 8 to 12 respectively, the distance measuring apparatus 42 can be swiveled or rotated in each case by a predetermined minimum angle in relation to at least two different axes, namely in respect of a first axis 50 and in respect of a second axis 52.

Here, the holder 22 in the embodiment in accordance with FIG. 2 is freely movable in space, for example in relation to an x-, y- and z-direction, by means of a total of three individual displacement units 26, 28, 30. By way of example, the displacement units 26, 28, 30 can be embodied as linear translation units, for example by means of linear motors. Independently of a deterministic adjustment or movement of the displacement units 26, 28, 30, corresponding distances to the individual reference objects 16, 18, 20, indicated by arrows in FIG. 2, can be determined in each case by means of further position sensors 72, 74, 76, which are provided in a dedicated manner for this purpose on the holder 22 and which are merely depicted in the schematic illustration in accordance with FIGS. 13 and 14. Therefore, the three sensors 72, 74, 76 render it possible to determine the position of the holder 22 in relation to the reference objects 16, 18, 20.

For the purposes of measuring the surface 15 of the object 14, provision is made for a scanning or sensing movement of a measurement beam, which is directed from the holder 22 to the surface 15 and elucidated in FIGS. 2 and 3 by, for example, the distance 24. The first distance sensor 44 aligned toward the object 14, the second distance sensor 46 and the further distance sensors 72, 74, 76 provided for determining the position of the holder 22 in relation to the reference objects 16, 18, 20 can be embodied in the form of a multi-wavelength sensor in each case, which is configured to determine an absolute distance between the respective sensor and a corresponding point on an opposite surface of the object 14 or of the respective reference object 16, 18, 20.

Since the surface 15 to be measured may be embodied as a so-called free-form surface with arbitrary curvature and arbitrary surface topology 17, what is necessary for optical, point-by-point scanning of the surface 15 is that the sensor 44 aligned in relation to the object 14, and consequently the measurement beam emitted by said sensor, is always approximately orthogonal or perpendicular to the surface portion 15 of the object 14 to be measured. The movement from one point 19 to a further, for example, directly adjacent measurement point can in this case require a translational movement in the x-, y- or z-direction of the holder 22 in relation to the object 14 and also in relation to the statically arranged reference objects 16, 18, 20.

Such a displacement movement of the holder 22 is furthermore typically accompanied by a corresponding swiveling of the distance measuring apparatus 42. Advantageously, the movement of the holder 22 and the alignment of the distance measuring apparatus 42 is determined and controlled, for example by evaluating the intensity reflected back from the object 14 by means of a computer-assisted control apparatus 70.

In order to be able to provide a distance measurement in the sub-micrometer or nanometer range, it is necessary to precisely log or compensate for positional inaccuracies of the distance measuring apparatus 42 which are caused by the swivelable mounting thereof on the holder 22. By virtue of the second distance sensor 46 determining the distance from the reference body 40, and consequently the distance from the reference surface 41 thereof, which distance emerges in each position of the distance measuring apparatus 42, the distance measuring apparatus 42 is ultimately configured always to determine the clear distance between selected points 21, 19 of the reference surface 41 and the surface 15 of the object 14 to be measured.

In particular, this can be established by forming the sum and/or difference of the individual distances 24, 48. In particular, the distance measuring apparatus 42 is arranged approximately in the center of an imaginary sphere, with the reference body 40 constituting, as it were, a segment or portion of said sphere. However, it is not mandatory to mount the distance measuring apparatus 42 in a manner coinciding with the sphere center point as long as the absolute positions of all points 21 on the reference surface 41 that can be sensed by the second distance sensor 46 are known and, by way of example, logged during a preceding calibration.

Figure 5:
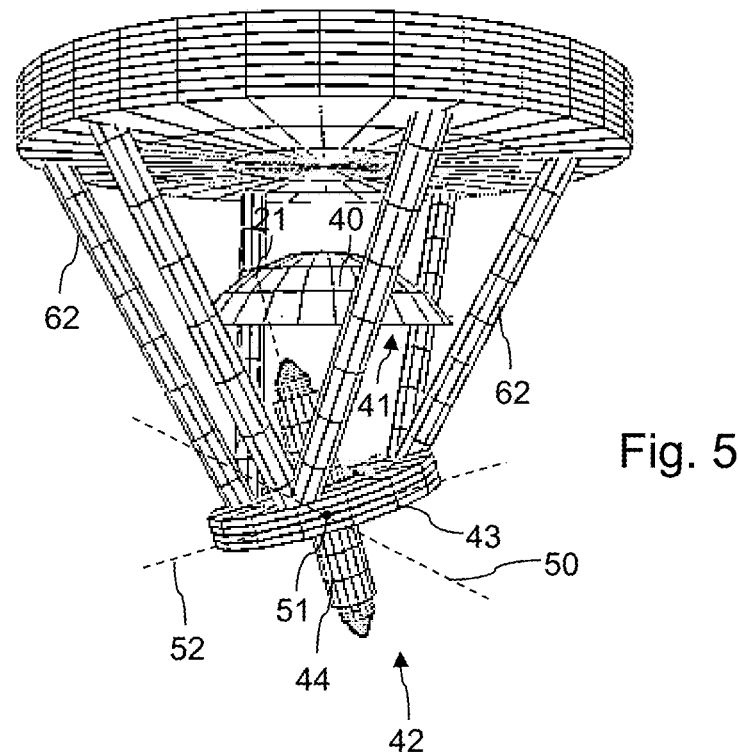
FIG. 5 shows the holder of FIG. 4 in a second, swiveled configuration.
Figure 6:
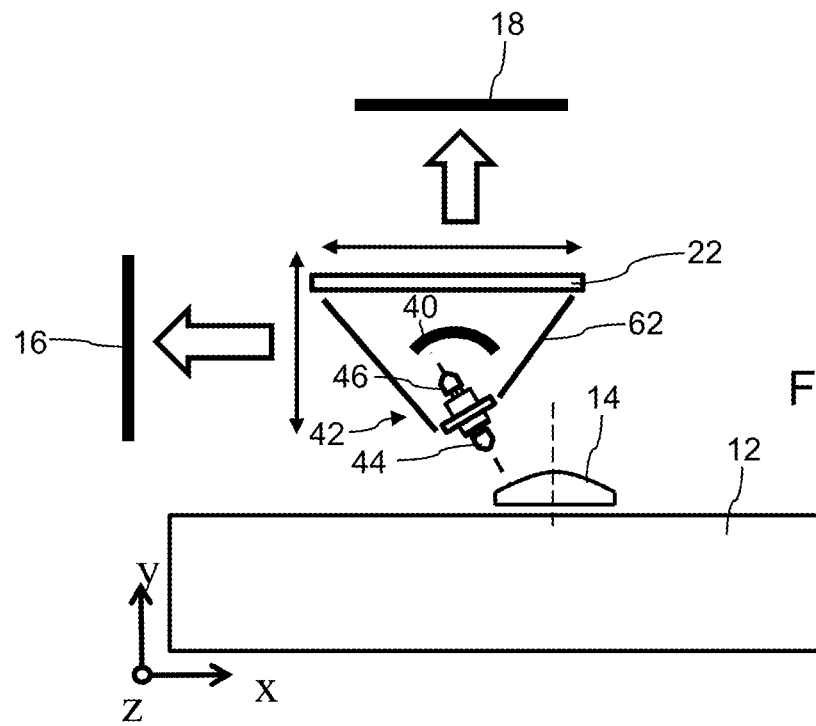
FIG. 6 shows a schematic illustration of the holder, as viewed in the xy-plane.
Figure 7:
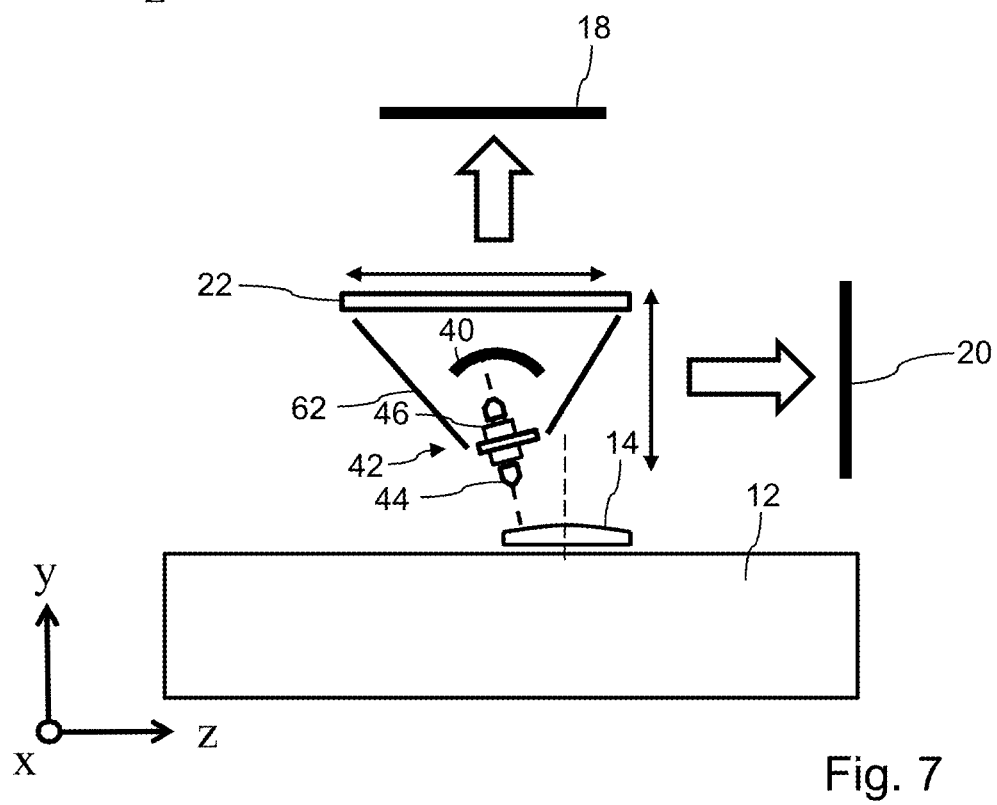
FIG. 7 shows the holder of FIG. 6, as viewed in the yz-plane.

The embodiment in accordance with FIGS. 4 to 7 shows one option for swiveling the distance measuring apparatus 42 equipped with the two distance sensors 44, 46 in almost arbitrary directions, but at least in respect of a first and a second axis 50, 52. For example, a support element 43, embodied in a plate-like manner, is arranged on the distance measuring apparatus 42, wherein the support element is arranged on the holder 22, depicted at the top in FIGS. 4 and 5, by means of a total of six suspensions 62 arranged in the circumferential direction and in a length-changeable manner on the support element 43. By way of example, the support element can be displaced from the approximately horizontal alignment, shown in FIG. 4, into a slightly tilted alignment, shown in FIG. 5, by means of a reorientation to be obtained by means of suitable adjustment motors and an effective change in the length of individual suspensions 62 emerging therefrom. As emerges furthermore from FIGS. 6 and 7, the support element 43 can be tilted and swiveled in arbitrary spatial directions together with the distance measuring apparatus 42 arranged thereon. It is also possible to arbitrarily change the location of the present, by way of example, imagined axes 50, 52. However, provision is advantageously made for the two axes to be placed as desired through the support element to have a crossing point 51, which is shown in FIG. 5 and which substantially coincides with an imaginary center point of the reference body 40.

Figure 8:
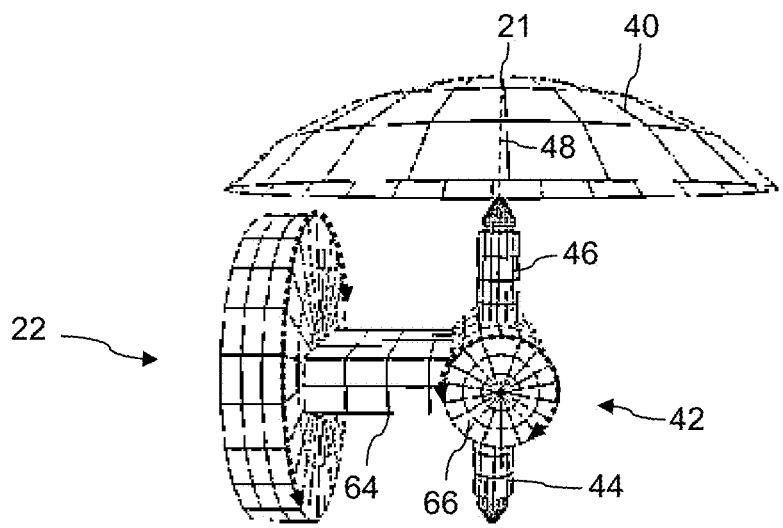
FIG. 8 shows an alternative embodiment of a holder in the style of a gimbal, comprising a distance measuring apparatus mounted on a rotatable cantilever.
Figure 9:
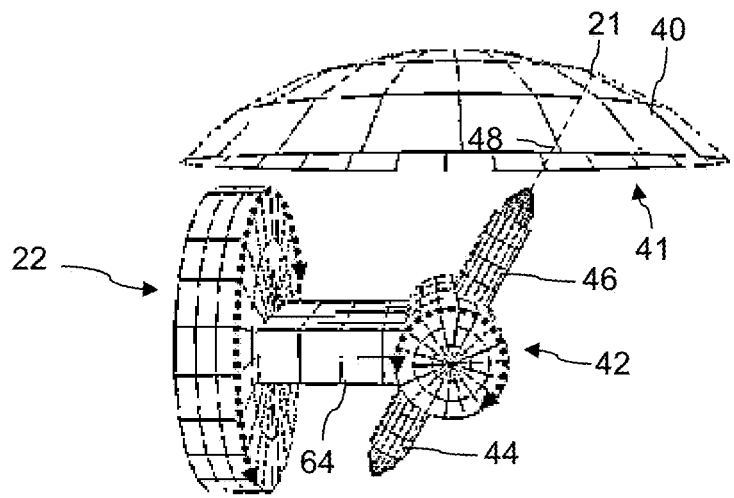
FIG. 9 shows the holder of FIG. 8 in a twisted or tilted embodiment.
Figure 10:
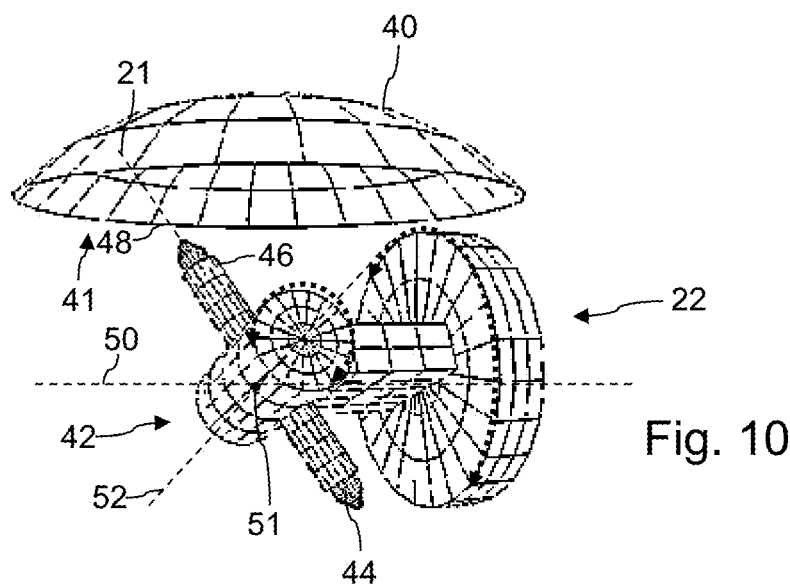
FIG. 10 shows the holder of FIG. 9 in a further, twisted configuration.

By contrast, in the alternative embodiment in accordance with FIGS. 8 to 12, the holder 22 includes a cantilever 64, which is aligned approximately horizontally in FIGS. 8 to 10, said cantilever being mounted on the holder 22 in a manner rotatable about the longitudinal axis 50 thereof. A further bearing 66 is arranged at an end of the cantilever 64 distant from the holder 22, the bearing axis or axis of rotation 52 of which bearing is aligned approximately perpendicular to the first axis 50. By means of the bearing 66, the distance measuring apparatus 42 is ultimately mounted on the cantilever 64 in such a swivelable manner and therefore on the holder 22 in a manner rotatable in relation to two axes 50, 52.

Figure 11:
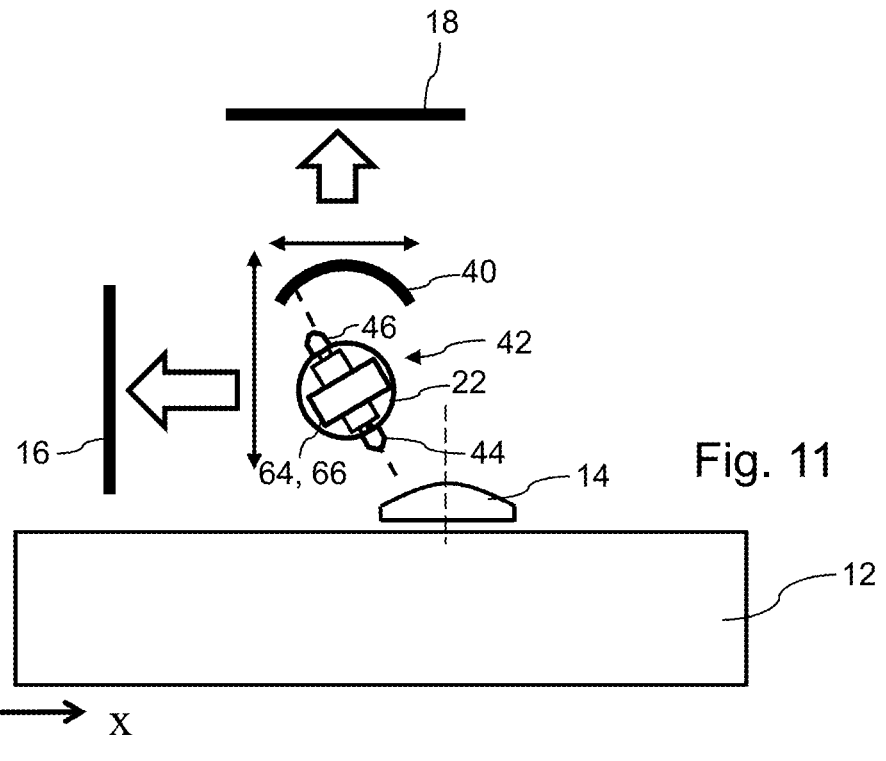
FIG. 11 shows a schematic illustration of the holder of FIGS. 8 to 10, as viewed in the yx-plane.
Figure 12:
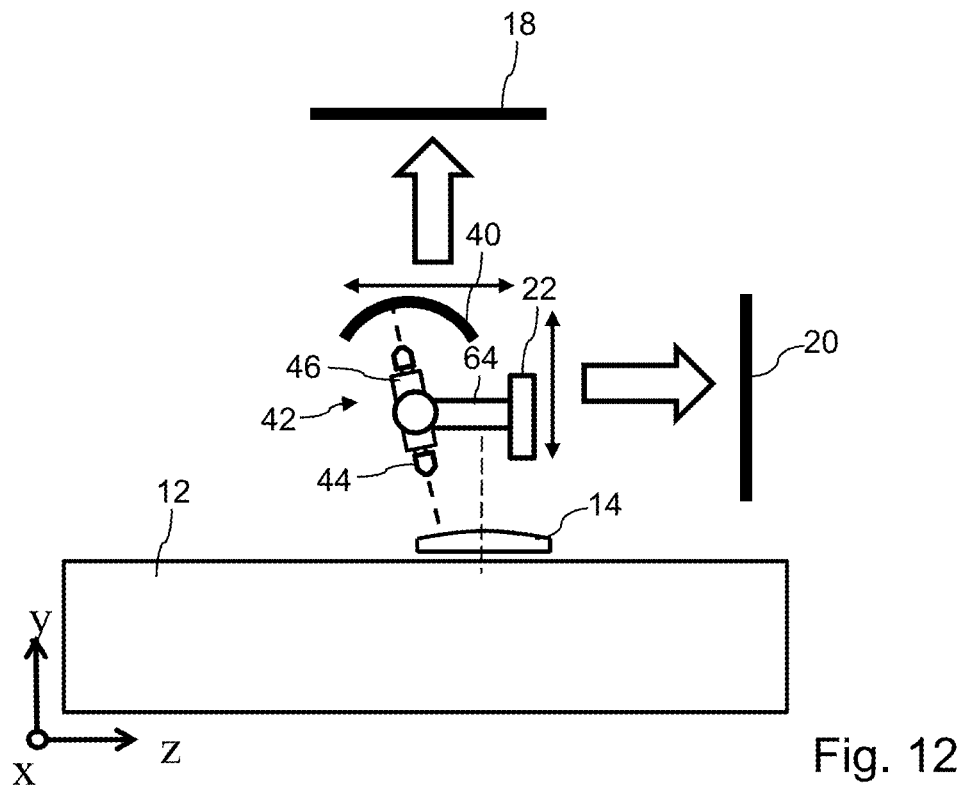
FIG. 12 shows an illustration of the holder of FIG. 11 in the yz-plane.

As depicted in FIGS. 11 and 12, the distance measuring apparatus 42 can also be swiveled here as desired both in the xy-plane and in the zy-plane so as always to enable an orthogonality condition of a measurement beam to the object surface 15, which beam is emitted by the first or main distance sensor 44.

Advantageously, the two sensors 44, 46 of the distance measuring apparatus 42 are fixed in relation to one another. Furthermore, in relation to the at least two axes of rotation 50, 52, they are aligned, in relation to one another, substantially diametrically in mutually opposite directions. Consequently, a change in the alignment of one sensor 44 is always accompanied by an appropriate or corresponding change in the alignment of the respective other sensor 46.

Here, the two sensors 44, 46 are embodied for measuring in a reflection geometry. This means that the measurement beam for example directed from the first distance sensor 44 to the point 19 of the surface 15 is reflected and re-detected by the first distance sensor 44 or coupled into the distance sensor 44 and ultimately fed to a separate sensor and detection unit 107, which is coupled by fiber-optic means to the distance sensor 44 and indicated in FIG. 13.

The connection between the distance sensors 44, 46 and also the position sensors 72, 74, 76 can in this case be achieved by fiber-optic coupling to individual detectors 100, 102, 104, 106, 107, which can be read directly by a control and evaluation unit 70. By way of example, if the first distance sensor 44 experiences a displacement due to rotation, for example in the direction of the object 14, this would reduce the distance 24 to be measured. However, such a displacement would simultaneously also increase, quantitatively by the same measure, the second distance 48 between the opposite second distance sensor 46 and the stationary reference surface 41. This displacement is measurable as a result of the coupling between the distance sensor 46 and the sensor or detection unit 106.

In this manner, possible positional inaccuracies of the distance sensors 44, 46 can be compensated for precisely by the second distance sensor 46 by virtue of measuring the second distance 48 in relation to the second point 21 on the reference surface 41, which second point corresponds to the first point 19 on the surface 15.

The angular position or the alignment emerging as a result of the rotation or swiveling of the distance measuring apparatus 42 in relation to the axes 50, 52 can be logged by the actuation apparatus (not shown separately in the present case) provided for moving the distance measuring apparatus 42 and can be made available to the control and evaluation unit 70.

The embodiment depicted in FIG. 3, which is realizable both by the hexapod solution depicted in FIGS. 4 to 7 and by the implementation of the holder as a gimbal solution based on a cantilever 64 in accordance with FIGS. 8 to 12, provides for the holder 22 to be configured to be displaceable in the y-direction only, while the support 12 is arranged displaceably in the xz-plane. In the case of such an embodiment, only a single two-dimensional reference object 18*b*, for example in the form of a planar mirror, is required, which is arranged, by way of example, below the support 12.

The remaining referencing or the remaining reference objects 16*a*, 16*b*, 18, 20*a*, 20*b* can in this case be configured as one-dimensional or linear reference objects. As a result of the one-dimensional displaceability of the holder 22 in the y-direction, the holder 22 is always situated at one and the same position in relation to the x- and z-direction. Furthermore, the reference object 18a, spaced apart in the y-direction, can have a virtually punctiform design, since a distance measurement in this case is always to one and the same point. A determination of the position of the support 12 in the xz-plane can be provided in relation to two further reference objects 20b, 16b, which likewise have a linear or rod-shaped design. A planar mirror 18b is only provided for determining the position of the support 12 or correcting the position and referencing the latter in the y-direction.

The further one-dimensional reference objects 16a and 20a enable a distance or position measurement of the holder 22 in the depicted xz-plane. Furthermore, in contrast to the embodiment of FIG. 2, only one displacement unit 27 is depicted in the configuration shown in FIG. 3, but said displacement unit enables a displacement of the object 14 in the plane (xy, z) provided by the support 12. In this respect, the displacement unit 27 may include two linear displacement units 28, 30 which, for example, are arranged perpendicular to one another. Accordingly, the functions of the two displacement units 28, 30 shown in FIG. 2 are implemented in the displacement unit 27 in the embodiment in accordance with FIG. 3. Furthermore, the support 12 shown in FIG. 3 includes two rack-like holders 12a, 12b for the displacement unit 26 or for the holder 22 arranged thereon.

The reference object 16 subdivided into the one-dimensional reference objects 16a and 16b serves to determine a relative position of holder 22 and support 12 in the x-direction, while the reference objects 20a and 20b enable a corresponding determination of the position in the z-direction. A corresponding statement applies here to reference objects 18 and 20.

Compared to the embodiment in accordance with FIG. 2, the embodiment according to FIG. 3 requires the implementation of three position sensors 72, 74, 76 provided for the holder 22 and three further support sensors 78, 80, 82 configured for determining the position of the support 12. However, the addition of three additional sensors 78, 80, 82 can be found to be advantageous and cost effective in respect of production and installation technical considerations in relation to an embodiment in accordance with FIG. 2, which includes three planar mirrors 16, 18, 20, in particular in respect of the calibration and setup of the device 10.

Here, the position sensors 72, 74, 76 arranged on the holder 22 serve for referencing and hence for determining a position in relation to the reference objects 16a, 18a and 20a, while the support sensors 78, 80, 82 serve for determining corresponding distances of the support 12 and/or of the displacement unit 27 and hence of the object 14 relative to the reference objects 16b, 18b and 20b. The position sensors 72, 74, 76 (not explicitly shown in FIG. 3) are in this case arranged on the holder 22 and the support sensors 78, 80, 82 are arranged on the support or on the displacement unit.

Figure 13:
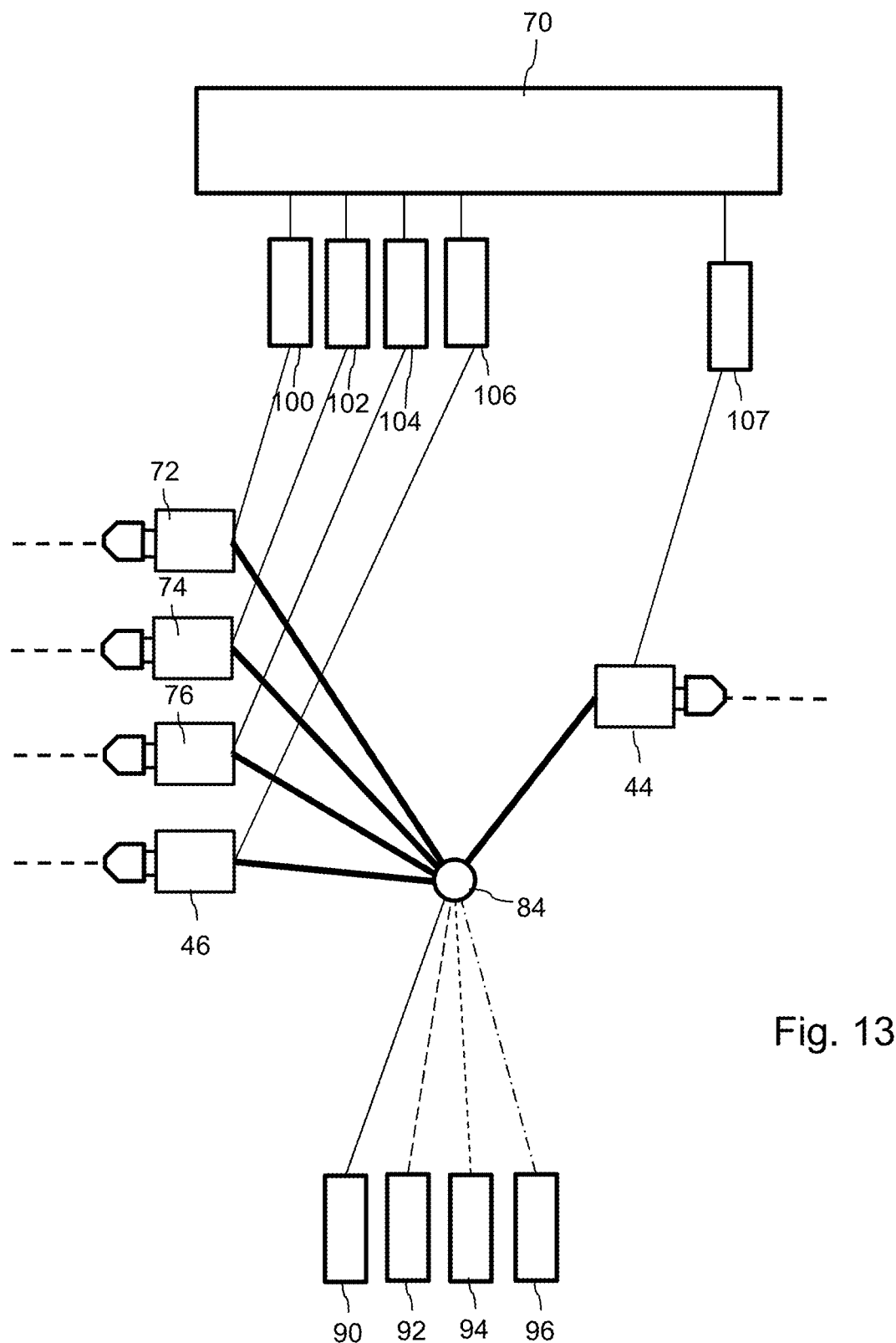
FIG. 13 shows a schematic illustration of the fiber-optic coupling of the configuration of the device shown in FIG. 2.
Figure 14:
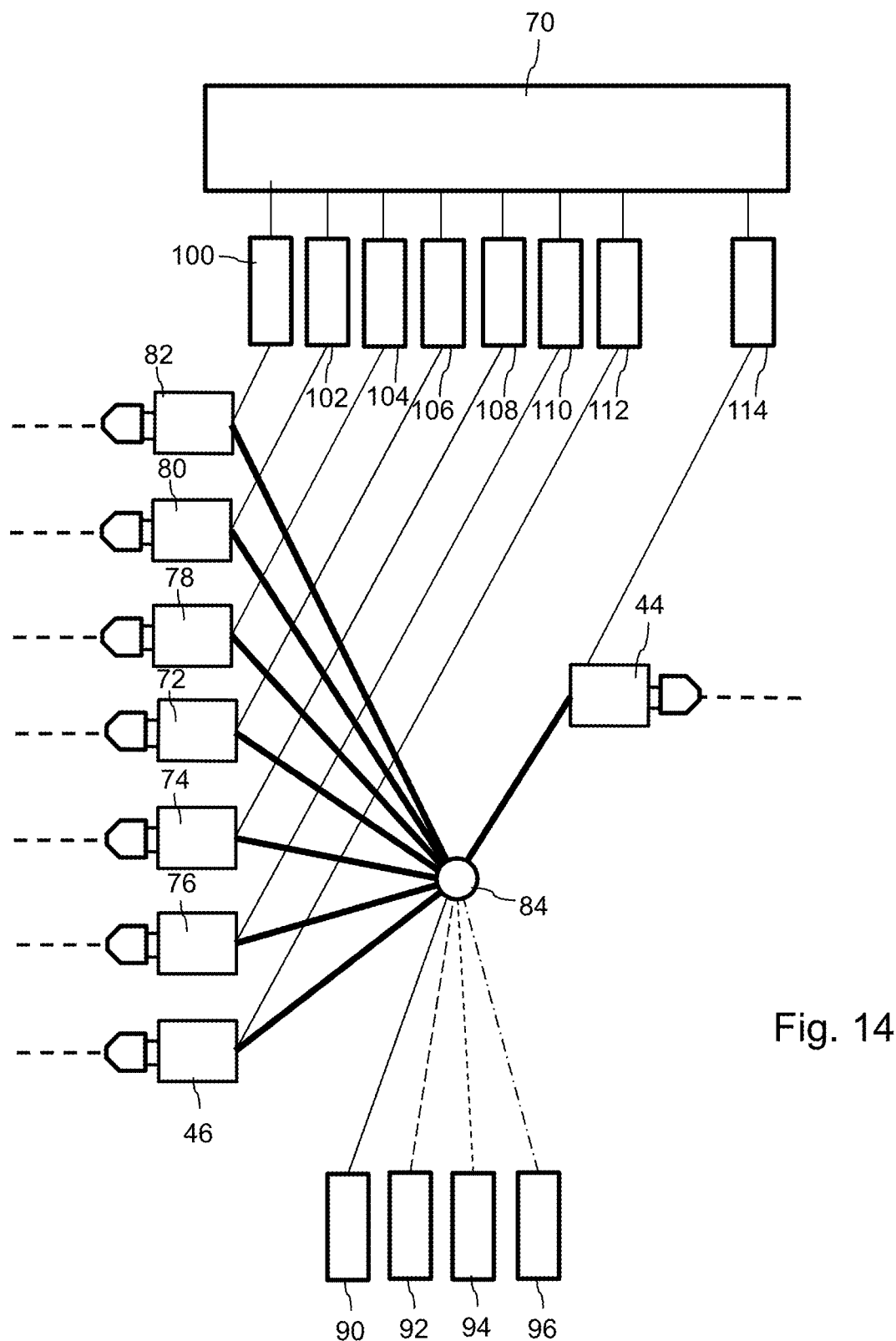
FIG. 14 shows a schematic illustration of the fiber-optic coupling of the configuration of the device shown in FIG. 3.

FIGS. 13 and 14 furthermore schematically illustrate the fiber-optic concept on which the measurement device shown in FIGS. 1 and 2 is based. In the present exemplary embodiment, the measurement device includes four laser light sources 90, 92, 94, 96 with different wavelengths. Here, all laser signals are fed to the first and the second multi-wavelength distance sensor 44, 46 by fiber-optic means. By means of said multi-wavelength distance sensor, the distance 24 to an object 14 to be measured can be measured according to a multi-wavelength measurement method. At least one of the employed lasers 90, 92, 94, 96, preferably all of these, is also used for the remaining position sensors 72, 74, 76 and support sensors 78, 80, 82.

Each of the shown position or support sensors 72, 74, 76, 78, 80, 82 can determine the distances, sketched in FIGS. 2 and 3, of the respectively assigned reference bodies 16, 18, 20. The measurement signals detected by the sensors 72, 74, 76, 78, 80, 82, 84 in reflection geometry are respectively fed individually to individual detectors 100, 102, 104, 106, 107, 108, 110, 112, 114 by fiber-optic means, the signals from which detectors are evaluable by the control and evaluation unit 70 for determining the surface topology 17.

In particular, the main distance sensor 44, but all other sensors as well, can be fed with signals from a total of four laser light sources 90, 92, 94, 96 by means of the multiplexer 84 sketched in FIGS. 13 and 14. In the process, the signal likewise detected in reflection geometry can be fed to a fiber splitter or demultiplexer (not shown explicitly), proceeding from the aforementioned sensors, which fiber splitter or demultiplexer can feed the interferometric measurement signal, which was detected and reflected by the surface of the object 14, to individual detectors in a wavelength selective manner.

Using suitable evaluation electronics, as are known from, for example, DE 10 2008 033 942 B3, it is possible to precisely establish, in the nanometer range or even in the sub-nanometer range, the distance 24 between the distance sensor 44 and the surface 15 of the object 14 to be measured.

Finally, reference is made to the fact that the number and type of the laser light sources described here and the arrangement of individual detectors are only shown in an exemplary manner. Very varied modifications in respect of the type and number and the fiber-optic coupling of individual light sources and detectors can be undertaken within the scope of the invention.

FIG. 15 finally shows a displaced sensor arrangement using the example of the configuration shown in FIG. 12. In contrast to the embodiment in accordance with FIG. 12, the two distance sensors 44, 46, and consequently the whole distance measuring apparatus 42, are arranged on the holder 22 displaced facing away from the object 14. Here, provision is in particular made for an imagined center point or a center of gravity of the distance sensors 44, 46 aligned diametrically in mutually opposite directions to come to rest between the axes of rotation 50, 52 of the holder and of the reference body 40.

In other words, the axes of rotation 50, 52, about which the distance measuring apparatus 42 is mounted in a rotatable manner, are situated between the distance measuring apparatus 42 and the object 14 to be measured. In this manner, it is possible to optimize a scanning movement sensing the surface 17 of the object 14, with said optimization being elucidated on the basis of the two FIGS. 16a and 16b.

Thus, FIG. 16a shows a measuring principle in which the distance measuring apparatus 42 coincides approximately with at least one of the axes of rotation 50, 52. In order to sense the surface 17 of the object, approximately perpendicular incidence of the measurement beam emitted by the sensor 44 is required at all times. Therefore, a displacement of the holder by the paths $\Delta X$ and $\Delta Y$ and a rotation of the distance measuring apparatus 42 through an angle $\Delta \alpha$ is to be provided for measuring two surface points 19 and 19'.

By contrast, if the axes of rotation are displaced slightly closer to the object 14, as shown in FIG. 16b, the result of this are shorter displacement paths $\Delta X$ and $\Delta Y$ for the holder from the geometric conditions changing herewith. Since the displacement of the holder in the spatial directions X, Y, Z restricts the scanning speed of the device in practical applications, shorter displacement paths for the holder 22 and consequently a reduction in the measurement time can be achieved by the shown displacement of the axis of rotation 50, 52.

In particular, skillful actuation of drives for the adjustment and displacement movements of the holder 22 and of the distance measuring apparatus 42 makes it possible, as it were, to displace the axes of rotation 50, 52 even virtually outside of the holder 22, for example to the surface 17 of the object 14 to be measured.

That which is claimed is:

1. A device for measuring at least one surface portion of an object, comprising a holder, on which a reference body and a distance measuring apparatus are arranged, wherein the distance measuring apparatus is mounted on the holder in a manner swivelable in relation to a first axis and in relation to a second axis, and wherein the distance measuring apparatus is configured to determine a first distance to a first point situated on the surface portion of the object and to determine a second distance to a second point situated on the reference body.

2. The device as claimed in claim 1, furthermore comprising a support for receiving the object, wherein the holder and the support are movable relative to one another.

3. The device as claimed in claim 1, wherein the distance measuring apparatus includes a first distance Sensor alignable in relation to the object and a second distance sensor alignable in relation to the reference body.

4. The device as claimed in claim 3, wherein the first distance sensor and the second distance sensors are fixed in their location in relation to one another.

5. The device as claimed in claim 3, wherein the first distance sensor and the second distance sensors are aligned diametrically in mutually opposite directions.

6. The device as claimed in claim 3, wherein the first distance sensor and the second distance sensors of the distance measuring apparatus are orientable or alignable in space at least within a predetermined, imagined conical volume.

7. The device as claimed in claim 1, wherein an imagined connecting line between the first point and the second point intersects a crossing point of the first axis and the second axis.

8. The device as claimed in claim 1, wherein the reference body includes a reference surface adapted to the swivelable movability of the distance measuring apparatus on the holder.

9. The device as claimed in claim 8, wherein the reference surface is embodied as a spherical hollow mirror with a substantially spherical segment-like geometry, the center point of which substantially coincides with the first axis and/or with the second axis.

10. The device as claimed in claim 1, wherein the distance measuring apparatus is arranged on the holder by means of at least three length or location changeable suspensions.

11. The device as claimed in claim 1, wherein the distance measuring apparatus is arranged on the holder by means of a bearing arranged on a cantilever in a manner rotatable about the second axis.

12. The device as claimed in claim 11, wherein the cantilever is mounted on the holder in a manner rotatable about the first axis.

13. The device as claimed in claim 3, furthermore comprising a control unit, which is configured to align the first distance sensor substantially along the surface normal of the first point of the surface portion of the object.

14. The device as claimed in claim 1, wherein a change in the first distance caused by a rotation of the distance measuring apparatus is able to be compensated on the basis of the second distance.

15. The device as claimed in claim 1, wherein at least three position sensors are coupled to the holder, by means of which position sensors the spatial position of the holder is determinable in relation to at least one reference object.

16. The device as claimed in claim 15, wherein at least three support sensors are provided, by means of which the spatial position of the support or of a displacement unit supporting the object is determinable in relation to the at least one reference object.

17. The device as claimed in claim 3, wherein the first axis and the second axis, in respect of which the distance measuring apparatus is mounted in a rotatable manner, are situated between a geometric center of the first distance sensor and the second distance sensor of the distance measuring apparatus and the object to be measured.

18. A method for measuring at least one surface portion of an object, wherein the object and a holder, on which a reference body and a distance measuring apparatus mounted in a manner swivelable in relation to a first axis and in relation to a second axis are arranged, are moved relative to one another in at least a first direction and wherein the distance measuring apparatus is swiveled in relation to the first axis and the second axis and wherein a first distance to a first point of the surface portion of the object and a second distance to a second point of the reference body corresponding thereto are determined by means of the distance measuring apparatus.

* * * * *